US009797762B2

(12) United States Patent
Tanaka

(10) Patent No.: US 9,797,762 B2
(45) Date of Patent: Oct. 24, 2017

(54) CONTROLLING DEVICE

(71) Applicant: Azbil Corporation, Tokyo (JP)

(72) Inventor: Masato Tanaka, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 1060 days.

(21) Appl. No.: 14/025,045

(22) Filed: Sep. 12, 2013

(65) Prior Publication Data

US 2014/0074301 A1 Mar. 13, 2014

(30) Foreign Application Priority Data

Sep. 12, 2012 (JP) .................................. 2012-200332

(51) Int. Cl.
G01F 23/22 (2006.01)

(52) U.S. Cl.
CPC .................................... G01F 23/22 (2013.01)

(58) Field of Classification Search
CPC ....................................................... G01F 23/22
See application file for complete search history.

(56) References Cited

U.S. PATENT DOCUMENTS

| 4,768,066 | A | 8/1988 | Ito |
| 5,059,880 | A | 10/1991 | Hiroi |
| 6,311,091 | B1 | 10/2001 | Yamahira |
| 6,959,219 | B2 | 10/2005 | Tanaka |
| 8,726,649 | B2 | 5/2014 | Nanjo et al. |
| 2003/0216823 | A1 | 11/2003 | Tanaka |
| 2004/0034509 | A1* | 2/2004 | Yamada ............ G05B 23/0262 702/185 |
| 2009/0146788 | A1 | 6/2009 | Suzuki |
| 2010/0303642 | A1 | 12/2010 | Nanjo et al. |

(Continued)

FOREIGN PATENT DOCUMENTS

| CN | 101452518 | 6/2009 |
| CN | 101900141 | 12/2010 |

(Continued)

OTHER PUBLICATIONS

Hiroi, "Fundamentals and applications of digital instrumentation control system"; Kogyougijutsusha, pp. 156-159, Oct. 1987.

(Continued)

*Primary Examiner* — Charles E Anya
(74) *Attorney, Agent, or Firm* — Oblon, McClelland, Maier & Neustadt, L.L.P.

(57) ABSTRACT

A controlling device includes an operating volume upper limit value OH1 storage unit that stores an operating volume upper limit value OH1 set from a device on a higher-level side, an operating volume upper limit value OH2 storage unit that stores an operating volume upper limit value OH2 set by an operator, an upper limit value selector that compares the operating volume upper limit values OH1 and OH2, and using the smaller as an operating volume upper limit value OH to be used in an upper limit limiting procedure, a control calculator that calculates an operating volume MV, and an upper limit processor that performs the upper limit limiting procedure to control the operating volume MV, calculated by the control calculator, to a value that is no greater than the operating volume upper limit value OH used by the upper limit value selector.

2 Claims, 12 Drawing Sheets

(56) References Cited

U.S. PATENT DOCUMENTS

| | | | | |
|---|---|---|---|---|
| 2011/0249371 A1* | 10/2011 | Jin | ............................ | H02H 5/04 |
| | | | | 361/103 |
| 2012/0016528 A1* | 1/2012 | Raman | .................. | G06F 9/5094 |
| | | | | 700/291 |
| 2012/0049922 A1 | 3/2012 | Tanaka et al. | | |
| 2012/0053747 A1 | 3/2012 | Tanaka et al. | | |
| 2013/0209088 A1* | 8/2013 | Rope | .................... | H04B 17/101 |
| | | | | 398/25 |

FOREIGN PATENT DOCUMENTS

| | | |
|---|---|---|
| CN | 102385359 | 3/2012 |
| JP | 05-313702 A | 11/1993 |
| JP | H7-212027 A | 8/1995 |
| JP | 2885047 B2 | 4/1999 |
| JP | H11-126743 A | 5/1999 |
| JP | H11-204412 A | 7/1999 |
| JP | 2000-214901 | 8/2000 |
| JP | 2003-330504 A | 11/2003 |
| JP | 2004-9099 A | 1/2004 |
| JP | 4426155 B2 | 3/2010 |
| JP | 2012-048533 A | 3/2012 |

OTHER PUBLICATIONS

Chinese Office Action dated Dec. 22, 2014, which issued during prosecution of Chinese Application Number 201310413788.4, which corresponds to the present application.

* cited by examiner

CONTROLLING DEVICE

CROSS REFERENCE TO RELATED APPLICATION

This application claims priority to Japanese Patent Application No. 2012-200332, filed on Sep. 12, 2012, the entire content of which being hereby incorporated herein by reference.

FIELD OF TECHNOLOGY

The present invention relates to a controlling device that is used on a lower level in combination with a higher-level device when a control solution that uses an operating volume upper limit value and/or an operating volume lower-limit value is executed by the higher-level device.

BACKGROUND

Given, for example, legislation arising from the global warming problem, there are demands for strengthened control of the quantity of energy used in factories and manufacturing lines. Because heat-producing equipment and air-conditioning equipment are facilities equipment that can consume a particularly large quantity of electricity, often the upper limit for the quantity of energy consumed is controlled so as to be kept lower than the maximum value in conventional equipment. For example, in facilities equipment that runs on electric power, the operations are performed in particular so that the quantity of electricity used will be within specific limitations prescribed by an electric power demand controlling system.

In particular, there have been proposals for methods, such as for electric power overall suppression and control, for limiting the total quantity of electric power that is supplied simultaneously at the time of startup in heat-producing equipment that is provided with a plurality of electric heaters (when heating up simultaneously the temperature in multiple areas wherein electric heaters are installed). See, for example, Japanese Unexamined Patent Application Publication 2012-048533 ("the JP '533"). FIG. 12 is a block diagram illustrating the structure of a heating device disclosed in the JP '533. The heating device includes a heat treatment furnace 100 for heating an object to be heated, heaters H1 through H4, which are a plurality of control actuators disposed within the heat treatment furnace 100, a plurality of temperature sensors S1 through S4 that measure the temperatures of regions that are heated by the respective heaters H1 through H4, a higher-level controller 101 of a total electric power limiting/controlling device for calculating operating volumes MV1 through MV4 to be outputted to the heaters H1 through the H4, a lower-level controller 102 of the total electric power limiting/controlling device, and electric power regulators 103-1 through 103-4, for providing to the respective heaters H1 through H4, electric power in accordance with the operating volumes MV1 through MV4 that are outputted from the lower-level total electric power limiting/controlling device 102.

The higher-level controller 101 of the total electric power limiting/controlling device receives information for a total allocated power PW that specifies the total amount of power used by the heaters H1 through H4, from a higher-level PC 104 that is a computer of a power demand managing system that manages the electric power, and then calculates the total amount of power used TW, which is the sum of the power used by the individual heaters H1 through H4, and then calculates operating volume upper limit values OH1_1 through OH1_4 for the individual control groups so that the total amount of power used TW does not exceed the total allocated power PW.

The lower-level controller 102 of the total power limiting/controlling device is structured from temperature controllers C1 through C4, which are structured from a plurality of control loops Ri (where i=1 through n), where, in the example in FIG. 12, the number n control loops is n=4. The individual temperature controllers C1 through C4 calculate the operating volumes MV1 through MV4 using, for example, respective PID control calculations, to execute upper limit limiting procedures to control the operating volumes MV1 through MV4 so as to be no higher than the operating volume upper limit values OH1_1 through OH1_4, and output, to the electric power regulators 103-1 through 103-4 of the corresponding control loops, the operating volumes MV1 through MV4 after the upper limit limiting procedures. Doing so achieves the limiting of the total electric power through the operations of the operating volume upper limit values OH1_1 through OH1_4 of the temperature controllers C1 through C4.

In the total electric power limiting/control disclosed in the JP '533, an ordinary temperature controller can be used as the lower-level controller 102. That is, this is an easy approach at instrumentation for the device manufacturer.

Note that in an ordinary temperature controller, within the temperature controller there is only one type of operating volume lower limit value OL and operating volume upper limit value OH, set by the user. Despite the fact that there are sometimes a plurality [of operating volume lower limit values OL and operating volume upper limit values OH] that are switched in coordination with the setting value SP (which is a temperature setting value for the case of temperature control) or the control variable PV (which is a temperature measurement value in the case of temperature control), this still does not change the fact that, as a type, there is only one type that is user-settable in the temperature controller. Moreover, while there are also those controlling devices that store, in a special area in memory, an operating volume lower limit value OL and an operating volume upper limit value OH for use only by the auto-tuning function for adjusting the PID parameters, this memory area, in the end, is used exclusively when performing auto-tuning See, for example, Japanese Unexamined Patent Application Publication 2003-330504 ("the JP '504"). That is, during the execution of PID control, two types of operating volume lower limit values OL and operating volume upper limit values OH are not provided simultaneously as candidates for application.

As described above, in an ordinary temperature controller, there is only one type of memory area for the operating volume lower limit value OL and the operating volume upper limit value OH, set by the user in the temperature controller. Consequently, when using a temperature controller as the lower-level controller 102 in, for example, the total energy limiting/control disclosed in the JP '533, there is no choice but to have the higher-level side monopolize the use of that single type of memory area for the operating volume lower limit value OL and the operating volume upper limit value OH. In the total power limiting/control disclosed in the JP '533, the procedure is one wherein the higher-level controller 101 ascertains in advance the operating volume upper limit value OH that normally would be set in the lower-level controller 102. For this reason, even if the operating volume lower limit value OL or the operating volume upper limit value OH is changed during the execution of control (after control has started) in the conditions in the lower-level controller 102, there may be transmissions for further changes from the higher-level controller 101 that assume an old (pre-change) operating volume upper limit value OH. That is, an operating volume upper limit value OH that has been updated by the lower-level controller 102 may be overwritten.

For example, let us assume that, when starting the total energy limiting/control disclosed in the JP '533, the operating volume upper limit value OH in the lower-level controller 102 is set to 100%. In the higher-level controller 101, this operating volume upper limit value OH=100% is registered in advance, so, based on this registration, the higher-level controller 101 sends, to the lower-level controller 102, a variable operating volume upper limit value OH of, for example, the operating volume upper limit value OH=90% or OH=80%. Given this, by overwriting the operating volume upper limit value OH in the memory area of the lower-level controller 102, the lower-level controller 102 will perform an upper limit limiting procedure for controlling the operating volume MV, calculated through the PID control calculations, so as to be no higher than the operating volume upper limit value OH.

At this time, let us assume that the operator of the lower-level controller 102 changes the operating volume upper limit value OH in the memory area of the lower-level controller 102 to 70%, given the circumstances on the lower-level side, through an operating panel of the lower-level controller 102 (the temperature controller). In an ordinary temperature controller, there is no function for constantly sending the operating volume upper limit value OH to the outside, and because the connections for the communication functions would be laborious if this were the standard instrumentation within the device, the modification of the operating volume upper limit value OH to 70% is not sent to the higher-level controller 101. In this case, the higher-level controller 101 would still assume the operating volume upper limit value OH=100% to calculate the operating volume upper limit value OH that is to be set in the lower-level controller 102, and thus the operating volume upper limit value OH calculated by the higher-level controller 101 would end up being written to the memory area of the lower-level controller 102. As a result, the limit of the operating volume upper limit value OH=70%, from the circumstances on the lower-level side, would be invalidated.

Note that temperature controllers are shipped from the temperature controller manufacturers to the device manufacturers, and the devices in which the temperature controllers are installed are shipped in large quantities from the device manufacturers to the end users. Because the temperature controller manufacturers, which are the control technology vendors, typically are the ones that take the lead, it is difficult, in practice, to get information all the way to the operators that are the end-users. Consequently, there are many cases wherein the operators on the lower-level side (the operators of the temperature controllers) do not know that there is the possibility that settings that are changed through the operating panel may be overwritten.

In methods wherein the operating volume lower limit value OL and the operating volume upper limit value OH are applied or determined by the higher-level side in this way, the actual purpose thereof, that of a procedure for limiting the operating volume MV, may be lost. The total power limiting/control disclosed in the JP '533 is a typical case of a control solution that uses the operating volume lower limit value OL and the operating volume upper limit value OH, and the problem areas described above are problem areas that are common to this type of control solution.

The present invention is created in order to solve the problem set forth above, and an aspect thereof is to provide a controlling device able to prevent invalidation of the limiting procedure that depends on the circumstances of the lower-level side when a control solution that uses an operating volume upper limit value and/or an operating volume lower limit value is performed by a device on the higher-level side.

SUMMARY

A controlling device according to the present invention includes an operating volume upper limit value OH1 storage unit that stores an operating volume upper limit value OH1 set from a device on a higher-level side, an operating volume upper limit value OH2 storage unit that stores an operating volume upper limit value OH2 set by an operator, an upper limit value selector that compares the operating volume upper limit value OH1 and the operating volume upper limit value OH2 and uses the smaller as an operating volume upper limit value OH to be used in an upper limit limiting procedure, a control calculator that calculates an operating volume MV, and an upper limit processor that performs the upper limit limiting procedure to control the operating volume MV, calculated by the control calculator, to a value that is no greater than the operating volume upper limit value OH used by the upper limit value selector.

One example configuration of the controlling device according to the present invention further includes an alarm outputting unit that outputs an alarm signal when the operating volume upper limit value OH that is used by the upper limit value selector is the operating volume upper limit value OH2 and the operating volume MV calculated by the control calculator is greater than the operating volume upper limit value OH.

Moreover, a controlling device according to the present invention includes an operating volume lower limit value OL1 storage unit that stores an operating volume lower limit value OL1 set from a device on a higher-level side, an operating volume lower limit value OL2 storage unit that stores an operating volume lower limit value OL2 set by an operator, a lower limit value selector that compares the operating volume lower limit value OL1 and the operating volume lower limit value OL2 and uses the larger as an operating volume lower limit value OL to be used in a lower limit limiting procedure, a control calculator that calculates an operating volume MV, and a lower limit processor that performs the lower limit limiting procedure to control the operating volume MV, calculated by the control calculator, to a value that is no less than the operating volume lower limit value OL used by the lower limit value selector.

One example configuration of the controlling device according to the present invention further includes an alarm outputting unit that outputs an alarm signal when the operating volume lower limit value OL that is used by the lower limit value selector is the operating volume lower limit value OL2 and the operating volume MV calculated by the control calculator is less than the operating volume lower limit value OL.

Moreover, a controlling device according to the present invention includes an operating volume upper limit value OH1 storage that stores an operating volume upper limit value OH1 set from a device on a higher-level side, an operating volume upper limit value OH2 storage unit that stores an operating volume upper limit value OH2 set by an operator, an operating volume lower limit value OL2 storage unit that stores an operating volume lower limit value OL2 set by an operator, an upper limit value selector that compares the operating volume upper limit value OH1 and the operating volume upper limit value OH2 and uses the smaller as an operating volume upper limit value OH to be used in an upper limit limiting procedure, an upper limit value modifying unit that compares the operating volume upper limit value OH1 and the operating volume lower limit value OL2 when the operating volume upper limit value OH used by the upper limit value selector is the operating volume upper limit value OH1, and if the operating volume upper limit value OH1 is less than the operating volume lower limit value OL2, uses the operating volume lower limit value OL2 as the operating volume upper limit value OH to be used by the upper limit limiting procedure, a control calculator that calculates an operating volume MV, an upper limit processor that performs the upper limit limiting procedure to control the operating volume MV, calculated by the control calculator, to a value that is no greater than the operating volume upper limit value OH used by the upper limit value selector for the upper limit processor, and a lower limit processor that performs a lower limit limiting procedure to control the operating volume MV, outputted from the upper limit processor, to a value that is no less than the operating volume lower limit value OL2 stored in the operating volume lower limit value OL2 storage unit.

One example configuration of the controlling device according to the present invention further includes a first alarm outputting unit that outputs an alarm signal when the operating volume upper limit value OH that is used by the upper limit value selector is the operating volume upper limit value OH2 and the operating volume MV calculated by the control calculator is greater than the operating volume upper limit value OH, and a second alarm outputting unit that outputs an alarm signal when the operating volume upper limit value OH that is used by the upper limit value modifying unit is the operating volume lower limit value OL2.

Moreover, a controlling device according to the present invention includes an operating volume lower limit value OL1 storage unit that stores an operating volume lower limit value OL1 set from a device on a higher-level side, an operating volume upper limit value OH2 storage unit that stores an operating volume upper limit value OH2 set by an operator, an operating volume lower limit value OL2 storage unit that stores an operating volume lower limit value OL2 set by an operator, a lower limit value selector that compares the operating volume lower limit value OL1 and the operating volume lower limit value OL2 and uses the larger as an operating volume lower limit value OL to be used in a lower limit limiting procedure, a lower limit value modifying unit that compares the operating volume lower limit value OL1 and the operating volume upper limit value OH2 when the operating volume lower limit value OL used by the lower limit value selector is the operating volume lower limit value OL1, and if the operating volume lower limit value OL1 is greater than the operating volume upper limit value OH2, uses the operating volume upper limit value OH2 as the operating volume lower limit value OL to be used by the lower limit limiting procedure, a control calculator that calculates an operating volume MV, a lower limit processor that performs the lower limit limiting procedure to control the operating volume MV, calculated by the control calculator, to a value that is no less than the operating volume lower limit value OL used by the lower limit value selector or the lower limit modifying unit, and an upper limit processor that performs an upper limit limiting procedure to control the operating volume MV, outputted from the lower limit processor, to a value that is no more than the operating volume upper limit value OH2 stored in the operating volume upper limit value OH2 storage unit.

One example configuration of the controlling device according to the present invention further includes a first alarm outputting unit that outputs an alarm signal when the operating volume lower limit value OL that is used by the lower limit value selector is the operating volume lower limit value OL2 and the operating volume MV calculated by the control calculator is less than the operating volume lower limit value OL, and a second alarm outputting unit that outputs an alarm signal when the operating volume lower limit value OL that is used by the lower limit value modifying unit is the operating volume upper limit value OH2.

In the present invention, an operating volume upper limit value OH1 and an operating volume upper limit value OH2 are compared, and the smaller is used as the operating volume upper limit value OH in the upper limit limiting procedure, making it possible to prevent invalidation of the upper limit limiting procedure that depends on the circumstances of the controlling device side through the operating volume upper limit value OH1 being set on the higher-level side.

Moreover, in the present invention, an alarm signal is outputted when the operating volume upper limit value OH that is used by the upper limit value selector is the operating volume upper limit value OH2 and the operating volume MV calculated by the control calculator is greater than the operating volume upper limit value OH, making it possible to cause the operator to be aware that a special situation has occurred.

In the present invention, an operating volume lower limit value OL1 and an operating volume upper limit value OL2 are compared, and the larger is used as the operating volume lower limit value OL in the lower limit limiting procedure, making it possible to prevent invalidation of the lower limit limiting procedure that depends on the circumstances of the controlling device side through the operating volume lower limit value OL1 being set on the higher-level side.

Moreover, in the present invention, an alarm signal is outputted when the operating volume lower limit value OL that is used by the lower limit value selector is the operating volume lower limit value OL2 and the operating volume MV calculated by the control calculator is less than the operating volume lower limit value OL, making it possible to cause the operator to be aware that a special situation has occurred.

Moreover, in the present invention, if, when the operating volume upper limit value OH used by the upper limit value selector is the operating volume upper limit value OH1 and the operating volume upper limit value OH1 is less than the operating volume lower limit value OL2, then the operating volume lower limit value OL2 is used as the operating volume upper limit value OH that is used in the upper limit limiting procedure, thus making it possible to handle the extremely discordant case of the operating volume upper limit value OH1 falling below the user-set operating volume lower limit value OL2.

Moreover, in the present invention, an alarm signal is outputted when the operating volume upper limit value OH that is used by the upper limit value modifying unit is the operating volume lower limit value OL2, making it possible to cause the operator to be aware that a special situation has occurred.

Moreover, in the present invention, if, when the operating volume lower limit value OL used by the lower limit value selector is the operating volume lower limit value OL1 and the operating volume lower limit value OL1 is greater than the operating volume upper limit value OH2, then the operating volume upper limit value OH2 is used as the operating volume lower limit value OL that is used in the lower limit limiting procedure, thus making it possible to handle the extremely discordant case of the operating volume lower limit value OL1 being above the user-set operating volume upper limit value OH2.

Moreover, in the present invention, an alarm signal is outputted when the operating volume lower limit value OL that is used by the lower limit value modifying unit is the operating volume upper limit value OH2, making it possible to cause the operator to be aware that a special situation has occurred.

BRIEF DESCRIPTIONS OF THE DRAWINGS

DETAILED DESCRIPTION

Principle

Figure 1:
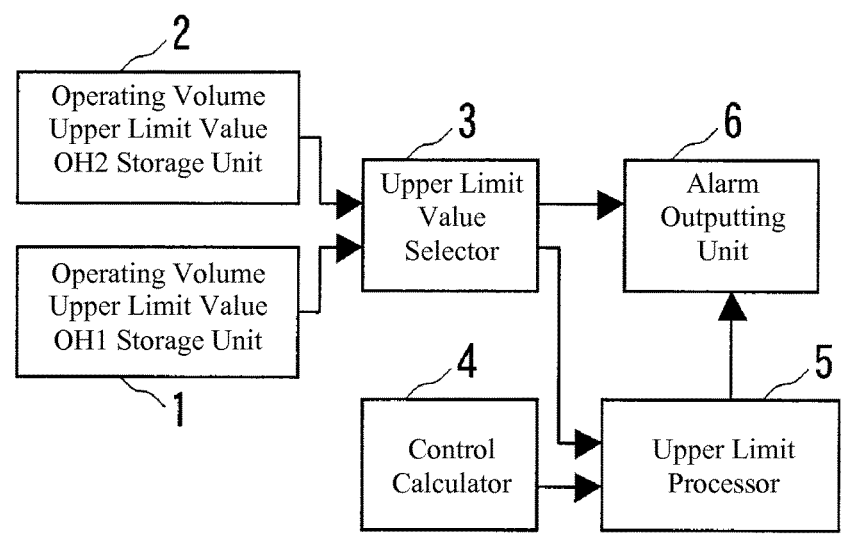
FIG. 1 is a block diagram illustrating a structure of a controlling device according to Example of the present invention.

The control solution is installed on the higher-level side (a PC function, or the like), and the operating volume lower limit value OL1 and operating volume upper limit value OH1 that are sent to the temperature controller on the lower-level side, as arbitrary settings, through communication are set in order to control the optimization of control of the temperature controller from the higher-level side. The operating volume lower limit value OL2 and the operating volume upper limit value OH2, which are set by the user in the temperature controller on the lower-level side, are set depending on the circumstances within the device, local information, or the like. In this case, the individual performing the setting is an operator at the end user (the device user).

While the operating volume lower limit values OL1 and OL2, and the operating volume upper limit values OH1 and OH2, are set for different reasons and thus may have different values, in the PID control calculations in the temperature controller the operating volume lower limit value OL and the operating volume upper limit value OH are used also as indicators in the anti-reset wind-up procedure, and thus, ultimately, the operating volume lower limit value OL and the operating volume upper limit value OH must each be limited to a single value. Stated conversely, there will be no problems insofar as the operating volume lower limit value OL is ultimately narrowed to a single value and the operating volume upper limit value OH is ultimately narrowed to a single value.

Here the inventor focused on the fact that considerations of safety and equipment service life are critically important in determining the operating volume lower limit value OL2 and the operating volume upper limit value OH2 on the lower-level side, where, in contrast, the determination of the operating volume lower limit value OL1 and the operating volume upper limit value OH1 on the higher-level side is based on ancillary requirements for the purposes of improved controllability or power limitation.

He also conceived of having two memory areas and providing, within the temperature controller, a procedure for giving priority to the operating volume lower limit value OL2 and the operating volume upper limit value OH2 that are set by the user in the temperature controller. Essentially, in a comparison of the operating volume upper limit value OH1 and the operating volume upper limit value OH2, whichever is smaller should be used, and in a comparison of the operating volume lower limit value OL1 and the operating volume lower limit value OL2, whichever is larger should be used.

For example, because the operating volume upper limit value OH2 that depends on a critical requirement is set in consideration of safety or equipment service life, there will be no problem from the perspective of safety or equipment service life if an operating volume upper limit value OH1 that is smaller than this operating volume upper limit value OH2 is used. On the other hand, the operating volume upper limit value OH1, which depends on ancillary requirements, is for the purpose of optimizing control, and so if an operating volume upper limit value OH2 that is smaller than this operating volume upper limit value OH1 is used, then although the operating volume MV may be too limited for optimization of control, somewhat sacrificing the ancillary requirement does not cause a large problem.

Another Principle

When there are two types of operating volume upper limit values OH1 and OH2, then it can be considered to be sufficient to compare these two types of operating volume upper limit values to each other to narrow in on one type. However, when there have been two types of operating volume upper limit values OH1 and OH2 that are set for different reasons, there has been a problem in that conflicts have been possible. For example, one major assumption has been that the magnitude relationship of OH2>OL2 has been satisfied between the operating volume lower limit value OL2 and the operating volume upper limit value OH2, for which the settings are determined for the same reason. However, with the operating volume upper limit value OH1, which is determined for a different reason, there may be an extremely discordant case wherein it falls below the operating volume lower limit value OL2, which is set by the user (OH1<OL2).

The same is true also for the case wherein there are two types of operating volume lower limit values OL1 and OL2. For example, in contrast to the operating volume lower limit value OL2 and the operating volume upper limit value OH2 for which the settings are determined for the same reason (OH2>OL2), with the operating volume lower limit value OL1, which is determined for a different reason, there may be an extremely discordant case wherein it falls below the operating volume upper limit value OH2, which is set by the user (OL1>OH2).

In these cases as well, we can focus on the fact that considerations of safety and equipment service life are critically important in determining the operating volume lower limit value OL2 and the operating volume upper limit value OH2 on the lower-level side, where, in contrast, the determination of the operating volume lower limit value OL1 and the operating volume upper limit value OH1 on the higher-level side is based on ancillary requirements for the purpose of improved controllability. That is, we can envision providing, within the temperature controller, a procedure for giving priority to the operating volume lower limit value OL2 and the operating volume upper limit value OH2 that are set by the user in the temperature controller. If, for example, OH1<OL2, then the value of OL2 ultimately will be used for both the operating volume upper limit value and the operating volume lower limit value, and if OL1>OH2, then the value of OH2 ultimately will be used for both the operating volume upper limit value and the operating volume lower limit value.

Yet Another Principle

When using the Principle described above, then when attempting to operate the operating volume MV from the higher-level side using the operating volume lower limit value OL1 and the operating volume upper limit value OH1 that are set arbitrarily through communication, a situation may occur wherein the operation of the operating volume is not achieved through the operating volume lower limit value OL2 or the operating volume upper limit value OH2 that are set by the user in the temperature controller. This situation is different from the situation wherein there is an ordinary limiting procedure performed for the operating volume MV, and thus the operator should be informed that a special situation has occurred.

Consequently, the inventor envisioned that an alarm able to trigger the awareness of the operator would be required in a case that is different from a situation wherein the normal limiting procedure is performed for the operating volume MV, and envisioned the provision of such an alarm function.

If using the Principle described above, a situation wherein an alarm should be produced is, specifically, a situation wherein the operating volume upper limit value OH2 is used, because of the comparison between the operating volume upper limit value OH1 and the operating volume upper limit value OH2, so that the operating volume MV is subjected to a limiting procedure by the operating volume upper limit value OH2 in a case wherein the operating volume upper limit value OH1 has been set aside. Even though the operating volume upper limit value OH2 is used, if, effectively, the operating volume MV is not subjected to a limiting process by the operating volume upper limit value OH2, then even if the operating volume upper limit value OH1 were to be used, then the operating volume MV would not be subjected to the limiting procedure by the operating volume upper limit value OH1, and so when viewed from the higher-level side, a situation would not occur wherein the operation was not achieved.

Moreover, if using the Principle described above, another situation wherein an alarm should be produced is, specifically, a situation wherein the operating volume lower limit value OL2 is used, because of the comparison between the operating volume lower limit value OL1 and the operating volume lower limit value OL2, so that the operating volume MV is subjected to a limiting procedure by the operating volume lower limit value OL2 in a case wherein the operating volume lower limit value OL1 has been set aside. Even though the operating volume lower limit value OL2 is used, if, effectively, the operating volume MV is not subjected to a limiting process by the operating volume lower limit value OL2, then even if the operating volume lower limit value OL1 were to be used, then the operating volume MV would not be subjected to the limiting procedure by the operating volume lower limit value OL1, and so when viewed from the higher-level side, a situation would not occur wherein the operation was not achieved.

Further Principle

When using the Another Principle described above, then when attempting to operate the operating volume MV from the higher-level side using the operating volume lower limit value OL1 and the operating volume upper limit value OH1 that are set arbitrarily through communication, a situation may occur wherein the operation of the operating volume is not achieved through the operating volume lower limit value OL2 or the operating volume upper limit value OH2 that are set by the user in the temperature controller. This situation is different from the situation wherein there is an ordinary limiting procedure performed for the operating volume MV, and thus the operator should be informed that a special situation has occurred.

Consequently, the inventor envisioned that an alarm able to trigger the awareness of the operator would be required in a case that is different from a situation wherein the normal limiting procedure is performed for the operating volume MV, and envisioned the provision of such an alarm function.

When the Another Principle, described above, is used, a situation wherein an alarm should be produced is, specifically, a situation wherein the value of OL2 is used as the operating volume upper limit value and the operating volume lower limit value when OH1<OL2.

When the Another Principle, described above, is used, another situation wherein an alarm should be produced is, specifically, a situation wherein the value of OH2 is used as the operating volume lower limit value and the operating volume upper limit value when OL1>OH2.

Example

A first form for carrying out the present invention will be explained below in reference to the figures. The present example corresponds to the Principle and the Yet Another Principle. FIG. 1 is a block diagram illustrating a structure of a controlling device according to the present example. The controlling device of the present example includes an operating volume upper limit value OH1 storage unit 1 that stores, primarily, an operating volume upper limit value OH1 that is set arbitrarily through communication, an operating volume upper limit value OH2 storage unit 2 that stores, primarily, an operating volume upper limit value OH2 that is set by a user, an upper limit value selector 3 that compares the operating volume upper limit value OH1 and the operating volume upper limit value OH2, and uses the smaller as the operating volume upper limit value OH that is to be used in the upper limit processor, described below, a control calculator 4 that calculates an operating volume MV, an upper limit processor 5 that performs an upper limit limiting procedure for controlling the value of the operating volume MV, calculated by the control calculator 4, so as to be no more than the operating volume upper limit value OH used by the upper limit value selector 3, and an alarm outputting unit 6 that outputs an alarm signal when the operating volume upper limit value OH used by the upper limit value selector 3 is the operating volume upper limit value OH2 and the operating volume MV is subjected to the upper limit limiting procedure by the upper limit processor 5.

Figure 12:
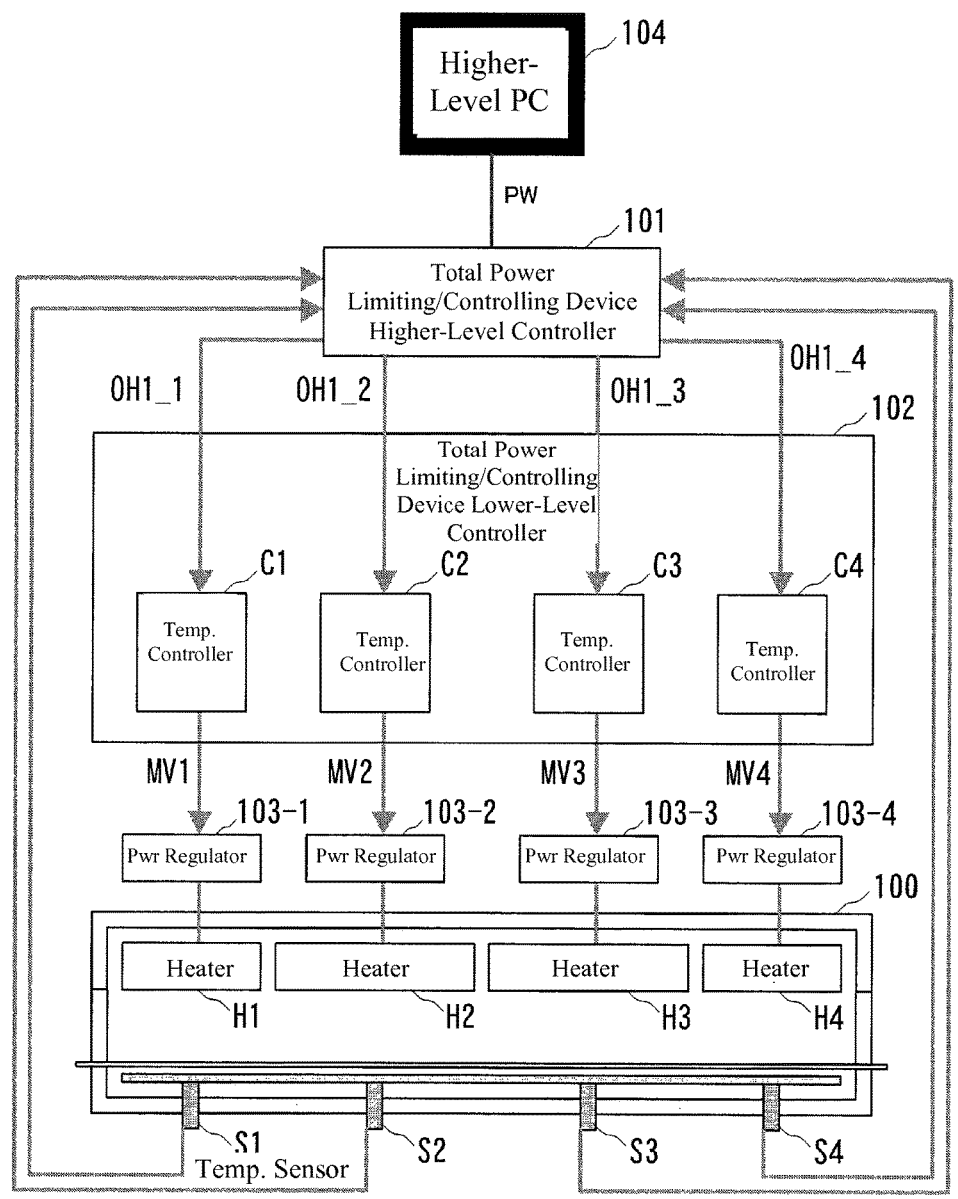
FIG. 12 is a block diagram illustrating a configuration of a heating device that is provided with a plurality of electric heaters.

The controlling device of FIG. 1 is achieved through a temperature controller. When applied to the heating device illustrated in FIG. 12 the controlling device of FIG. 1 corresponds to the respective temperature controllers C1 through C4. In this case, the operating volume upper limit value OH1 that is sent from the higher-level controller 101 of the total power controlling/limiting device is stored in the operating volume upper limit value OH1 storage unit 1.

The operation of the controlling device according to the present example will be explained next using FIG. 2. First the operator sets, offline, the operating volume upper limit value OH2 in the operating volume upper limit value OH2 storage unit 2 through an operating panel (not shown) of the controlling device in FIG. 1, prior to the commencement of control (Step S100 in FIG. 2). Here let us assume that the operating volume upper limit value OH2 is set to 90%.

Following this, when the control solution using the operating volume upper limit value OH is started by the higher-level side (YES in Step S101 in FIG. 2), a series of procedures is started in the controlling device of FIG. 1 as well. For example, for the case of total electric power limiting/control disclosed in the JP '533, the operation of the higher-level controller 101, for limiting the use of electric power, is started.

Figure 2:
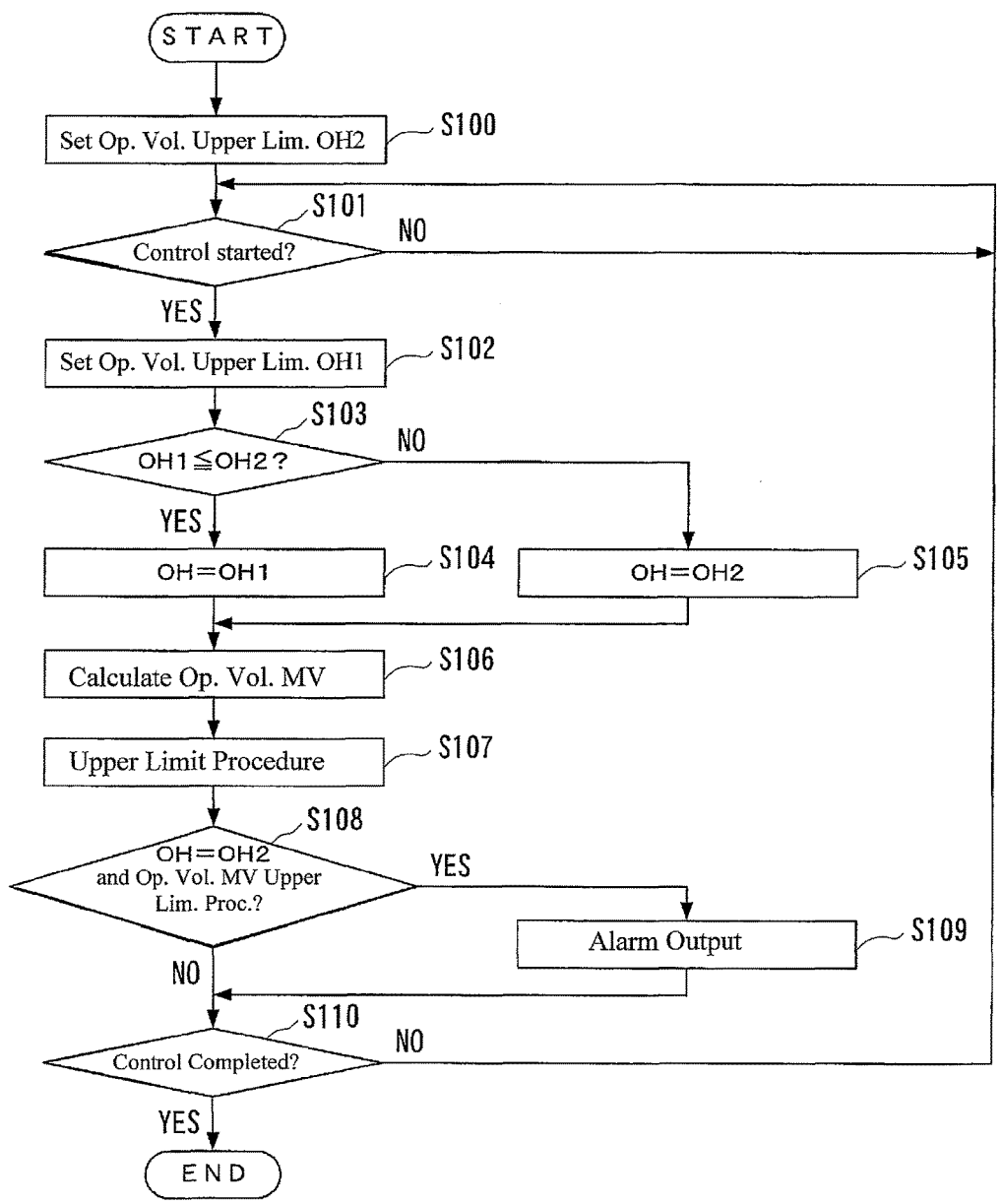
FIG. 2 is a flowchart for explaining the operation of the controlling device according to the Example of the present invention.

Operation when the Operating Volume Upper Limit Value OH1 is Selected and the Operating Volume MV is not Subjected to the Upper Limit Limiting Procedure The higher-level controller 101 sets, online, the operating volume upper limit value OH1 in the operating volume upper limit value OH1 storage unit 1 (Step S102 in FIG. 2). Here let us assume that the operating volume upper limit value OH1 is set to 80%.

The upper limit value selector 3 compares the operating volume upper limit value OH1 and the operating volume upper limit value OH2 (Step S103 in FIG. 2), and uses the smaller as the operating volume upper limit value OH to be used by the upper limit processor 5. Because OH1=80% and OH2=90%, the upper limit value selector 3 selects OH1=80%, and sets, for the upper limit processor 5, the operating volume upper limit value OH=OH1=80% (Step S104 in FIG. 2). Note that if the operating volume upper limit value OH1 and OH2 are equal, then the operating volume upper limit value OH1 may be selected.

Following this, the control calculator 4 calculates an operating volume MV through a PID control calculation, such as the following transfer function equation (Step S106 in FIG. 2):

$$MV=(100/Pb)\{1+(1/Tis)+Tds\}(SP-PV) \quad (1)$$

In Equation (1), SP is a setting value (a temperature setting value, for the case wherein the controlling device is applied to a heating device), PV is a control variable (a temperature measurement value for a case wherein the controlling device is applied to a heating device), Pb is a proportional band that is set in advance, Ti is an integrating time that is set in advance, Td is a differentiating time that is set in advance, and s is the Laplace operator. Here let us assume that an operating volume MV=70% is calculated.

The upper limit processor 5 performs an upper limit limiting procedure to limit the operating volume MV, calculated by the control calculator 4, to a value that is no higher than the operating volume upper limit value OH used by the upper limit value selector 3, and outputs, to a control object (which is an electric power regulator 103 in the case of the controlling device being applied to a heating device), an operating volume MV that has been subjected to the limiting procedure (Step S107 in FIG. 2).

$$\text{IF } MV>OH \text{ THEN } MV=OH \quad (2)$$

That is, if the operating volume MV is greater than the operating volume upper limit value OH, then the upper limit processor 5 sets the operating volume MV=OH. Here the operating volume MV=70% and the operating volume upper limit value OH=80%, so the operating volume MV=70% is outputted without change.

Although in a case wherein the operating volume upper limit value OH used by the upper limit value selector 3 is the operating volume upper limit value OH2 and the operating volume MV has been subjected to the upper limit limiting procedure by the upper limit processor 5 (YES in Step S108 in FIG. 2), the alarm outputting unit 6 would output an alarm signal (Step S109 in FIG. 2), here the operating volume upper limit value OH used by the upper limit value selector 3 is the operating volume upper limit value OH1, so the alarm outputting unit 6 does not output an alarm signal.

The processes in Step S101 through S109 as described above are repeated at each control interval until the control is terminated through, for example, an instruction from an operator (YES in Step S110 in FIG. 2).

Operation when the Operating Volume Upper Limit Value OH1 is Selected and the Operating Volume MV is Subjected to the Upper Limit Limiting Procedure When in Step S102 in FIG. 2 the higher-level controller 101 sets, online, the operating volume upper limit value OH1=75% in the operating volume upper limit value OH1 storage unit 1, the upper limit value selector 3 compares the operating volume upper limit value OH1=75% and the operating volume upper limit value OH2=90% (Step S103 in FIG. 2), and uses OH1=75%, which is the smaller, as the operating volume upper limit value OH to be used by the upper limit processor 5 (Step S104 in FIG. 2).

Let us assume that in Step S106 in FIG. 2, the control calculator 4 calculates the operating volume MV=80%.

The upper limit processor 5 limits the operating volume MV=80%, calculated by the control calculator 4, to a value that is no higher than the operating volume upper limit value OH=75% used by the upper limit value selector 3, and outputs, to the control object, the operating volume MV=75% that has been subjected to the limiting procedure (Step S107 in FIG. 2).

Because the operating volume upper limit value OH used by the upper limit value selector 3 is the operating volume upper limit value OH1 (NO in Step S108 in FIG. 2), the alarm outputting unit 6 does not output an alarm signal.

Operation when the Operating Volume Upper Limit Value OH2 is Selected and the Operating Volume MV is not Subjected to the Upper Limit Limiting Procedure When in Step S102 in FIG. 2 the higher-level controller 101 sets, online, the operating volume upper limit value OH1=95% in the operating volume upper limit value OH1 storage unit 1, the upper limit value selector 3 compares the operating volume upper limit value OH1=95% and the operating volume upper limit value OH2=90% (Step S103 in FIG. 2), and uses OH2=90%, which is the smaller, as the operating volume upper limit value OH to be used by the upper limit processor 5 (Step S105 in FIG. 2).

Let us assume that in Step S106 in FIG. 2, the control calculator 4 calculates the operating volume MV=85%.

The upper limit processor 5 limits the operating volume MV=85%, calculated by the control calculator 4, to a value that is no higher than the operating volume upper limit value OH=90% used by the upper limit value selector 3, and outputs, to the control object, the operating volume MV=85% as-is (Step S107 in FIG. 2).

Because the operating volume MV was not subjected to the upper limit limiting procedure (NO in Step S108 in FIG. 2), the alarm outputting unit 6 does not output an alarm signal.

Operation when the Operating Volume Upper Limit Value OH2 is Selected and the Operating Volume MV is Subjected to the Upper Limit Limiting Procedure When in Step S102 in FIG. 2 the higher-level controller 101 sets, online, the operating volume upper limit value OH1=95% in the operating volume upper limit value OH1 storage unit 1, the upper limit value selector 3 compares the operating volume upper limit value OH1=95% and the operating volume upper limit value OH2=90% (Step S103 in FIG. 2), and uses OH2=90%, which is the smaller, as the operating volume upper limit value OH to be used by the upper limit processor 5 (Step S105 in FIG. 2).

Let us assume that in Step S106 in FIG. 2, the control calculator 4 calculates the operating volume MV=93%.

The upper limit processor 5 limits the operating volume MV=93%, calculated by the control calculator 4, to a value that is no higher than the operating volume upper limit value OH=90% used by the upper limit value selector 3, and outputs, to the control object, the operating volume MV=90% that has been subjected to the limiting procedure (Step S107 in FIG. 2).

The operating volume upper limit value OH used by the upper limit value selector 3 is the operating volume upper limit value OH2 and the operating volume MV has been subjected to the upper limit limiting procedure by the upper limit processor 5 (YES in Step S108 in FIG. 2), so the alarm outputting unit 6 outputs an alarm signal (Step S109 in FIG. 2). The approach for outputting the alarm may be a display, an illuminated light, an audio output, or the like, in response to the alarm signal.

In the present example, as described above, an operating volume upper limit value OH1 and an operating volume upper limit value OH2 are compared, and the smaller is used as the operating volume upper limit value OH in the upper limit processor 5, making it possible to prevent invalidation of the upper limit limiting procedure that depends on the circumstances of the controlling device (temperature controller) side through the operating volume upper limit value OH1 being set on the higher-level side. Moreover, in the present example, an alarm signal is outputted when the operating volume upper limit value OH that is used by the upper limit value selector 3 is the operating volume upper limit value OH2 and the operating volume MV is subjected to the upper limit limiting procedure by the upper limit processor 5, making it possible to cause the operator to be aware that a special situation has occurred.

Another Example

Figure 3:
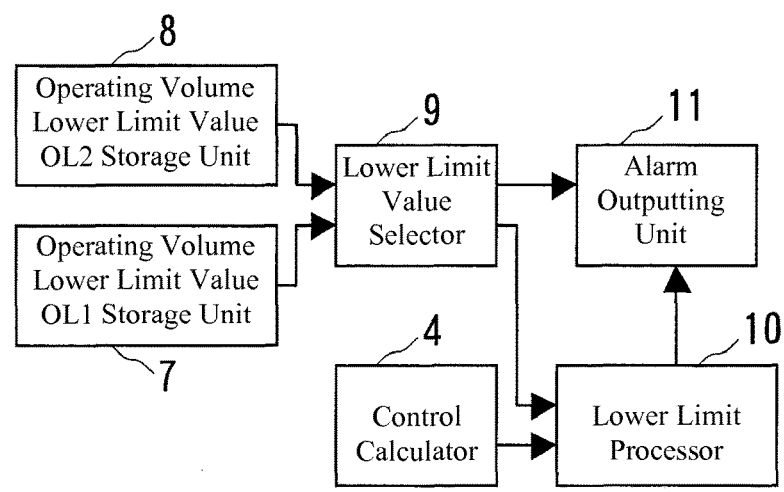
FIG. 3 is a block diagram illustrating a structure of a controlling device according to Another Example of the present invention.

Another Example according to the present invention will be explained next. The present example is another example corresponding to the Principle and the Yet Another Principle. FIG. 3 is a block diagram illustrating a structure of a controlling device according to the present example. The controlling device of the present example includes the control calculator 4, an operating volume lower limit value OL1 storage unit 7 that stores, primarily, an operating volume lower limit value OL1 that is set arbitrarily through communication, an operating volume lower limit value OL2 storage unit 8 that stores, primarily, an operating volume lower limit value OL2 that is set by a user, a lower limit value selector 9 that compares the operating volume lower limit value OL1 and the operating volume lower limit value OL2, and uses the greater as the operating volume lower limit value OL that is to be used in the lower limit processor, described below, a lower limit processor 10 that performs a lower limit limiting procedure for controlling the value of the operating volume MV, calculated by the control calculator 4, so as to be no less than the operating volume lower limit value OL used by the lower limit value selector 9, and an alarm outputting unit 11 that outputs an alarm signal when the operating volume lower limit value OL used by the lower limit value selector 9 is the operating volume lower limit value OL2 and the operating volume MV is subjected to the lower limit limiting procedure by the lower limit processor 10. The controlling device of FIG. 3 is achieved through a temperature controller.

The operation of the controlling device according to the present example will be explained next using FIG. 4. First the operator sets, offline, the operating volume lower limit value OL2 in the operating volume lower limit value OL2 storage unit 8 through an operating panel (not shown) of the controlling device in FIG. 3, prior to the commencement of control (Step S200 in FIG. 4). Here let us assume that the operating volume lower limit value OL2 is set to 10%.

Following this, when the control solution using the operating volume lower limit value OL is started by the higher-level side device (such as a PC) (YES in Step S201 in FIG. 4), a series of procedures is started in the controlling device of FIG. 3 as well.

Figure 4:
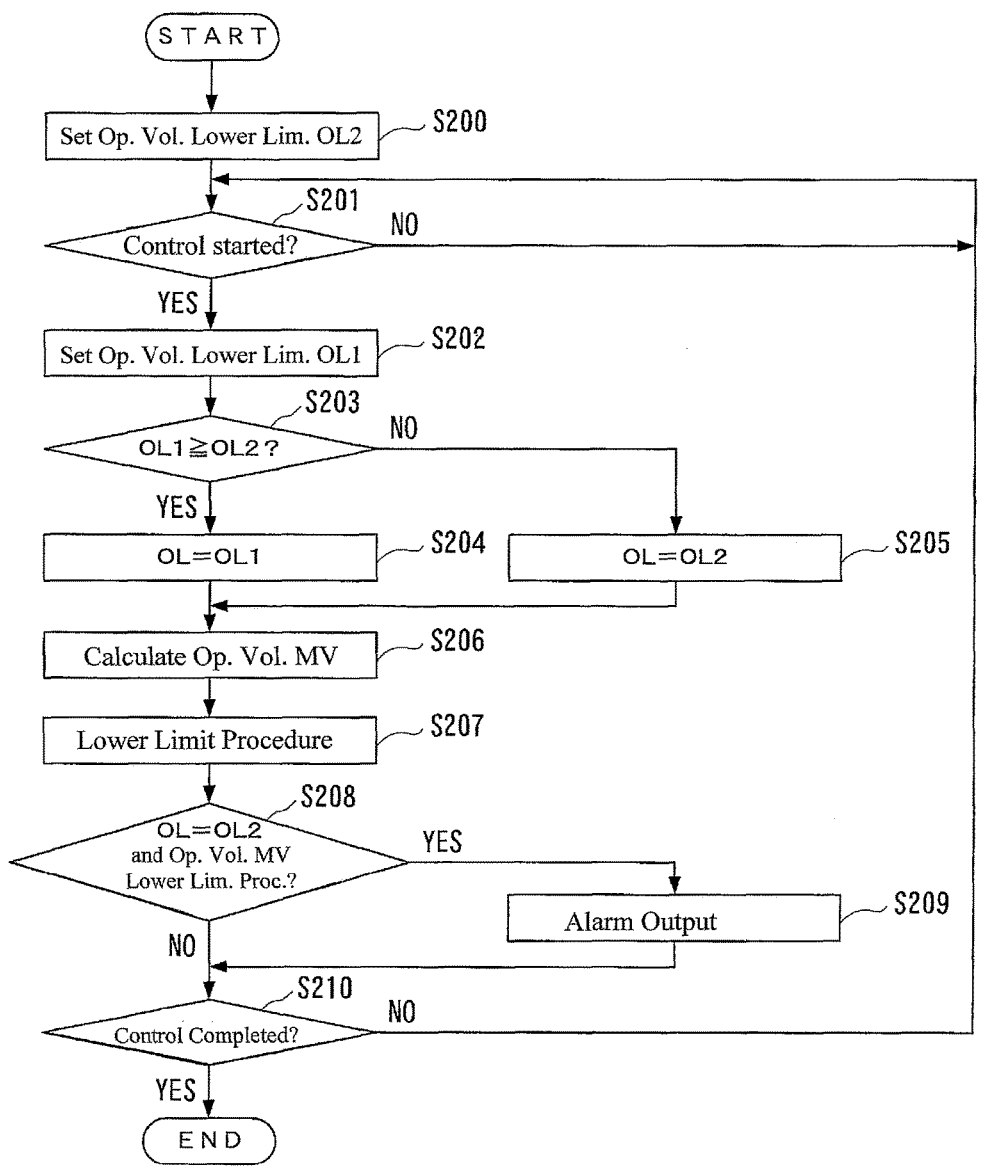
FIG. 4 is a flowchart for explaining the operation of the controlling device according to the Another Example of the present invention.

Operation when the Operating Volume Lower Limit Value OL1 is Selected and the Operating Volume MV is not Subjected to the Lower Limit Limiting Procedure The device on the higher-level side sets, online, the operating volume lower limit value OL1 in the operating volume lower limit value OL1 storage unit 7 (Step S202 in FIG. 4). Here let us assume that the operating volume lower limit value OL1 is set to 20%.

The lower limit value selector 9 compares the operating volume lower limit value OL1 and the operating volume lower limit value OL2 (Step S203 in FIG. 4), and uses the larger as the operating volume lower limit value OL to be used by the lower limit processor 10. Because OL1=20% and OL2=10%, the lower limit value selector 9 selects OL1=20%, and sets, for the lower limit processor 10, the operating volume lower limit value OL=OL1=20% (Step S204 in FIG. 4). Note that if the operating volume lower limit value OL1 and OL2 are equal, then the operating volume lower limit value OL1 may be selected.

Following this, the control calculator 4 calculates an operating volume MV through a PID control calculation (Step S206 in FIG. 4). This procedure is identical to that in Step S106 in FIG. 2. Here let us assume that an operating volume MV=30% is calculated.

The lower limit processor 10 performs a lower limit limiting procedure to limit the operating volume MV, calculated by the control calculator 4, to a value that is no less than the operating volume lower limit value OL used by the lower limit value selector 9, and outputs, to the control object, the operating volume MV that has been subjected to the limiting procedure (Step S207 in FIG. 4).

$$\text{IF } MV < OL \text{ THEN } MV = OL \qquad (3)$$

That is, if the operating volume MV is less than the operating volume lower limit value OL, then the lower limit processor 10 sets the operating volume MV=OL. Here the operating volume MV=30% and the operating volume lower limit value OL=20%, so the operating volume MV=30% is outputted without change.

Although in a case wherein the operating volume lower limit value OL used by the lower limit value selector 9 is the operating volume lower limit value OL2 and the operating volume MV has been subjected to the lower limit limiting procedure by the lower limit processor 10 (YES in Step S208 in FIG. 4), the alarm outputting unit 11 would output an alarm signal (Step S209 in FIG. 4), here the operating volume lower limit value OL used by the lower limit value selector 9 is the operating volume lower limit value OL1, so the alarm outputting unit 11 does not output an alarm signal.

The processes in Step S201 through S209 as described above are repeated at each control interval until the control is terminated through, for example, an instruction from an operator (YES in Step S210 in FIG. 4).

Operation when the Operating Volume Lower Limit Value OL1 is Selected and the Operating Volume MV is Subjected to the Lower Limit Limiting Procedure When in Step S202 in FIG. 4 the device on the higher-level side sets, online, the operating volume lower limit value OL1=25% in the operating volume lower limit value OL1 storage unit 7, the lower limit value selector 9 compares the operating volume lower limit value OL1=25% and the operating volume lower limit value OL2=10% (Step S203 in FIG. 4), and uses OL1=25%, which is the larger, as the operating volume lower limit value OL to be used by the lower limit processor 10 (Step S204 in FIG. 4).

Let us assume that in Step S206 in FIG. 4, the control calculator 4 calculates the operating volume MV=20%.

The lower limit processor 10 limits the operating volume MV=20%, calculated by the control calculator 4, to a value that is no less than the operating volume lower limit value OL=25% used by the lower limit value selector 9, and outputs, to the control object, the operating volume MV=25% that has been subjected to the limiting procedure (Step S207 in FIG. 4).

Because the operating volume lower limit value OL used by the lower limit value selector 9 is the operating volume lower limit value OL1 (NO in Step S208 in FIG. 4), the alarm outputting unit 11 does not output an alarm signal.

Operation when the Operating Volume Lower Limit Value OL2 is Selected and the Operating Volume MV is not Subjected to the Lower Limit Limiting Procedure When in Step S202 in FIG. 4 the device on the higher-level side sets, online, the operating volume lower limit value OL1=5% in the operating volume lower limit value OL1 storage unit 7, the lower limit value selector 9 compares the operating volume lower limit value OL1=5% and the operating volume lower limit value OL2=10% (Step S203 in FIG. 4), and uses OL2=10%, which is the larger, as the operating volume lower limit value OL to be used by the lower limit processor 10 (Step S205 in FIG. 4).

Let us assume that in Step S206 in FIG. 4, the control calculator 4 calculates the operating volume MV=15%.

The lower limit processor 10 limits the operating volume MV=15%, calculated by the control calculator 4, to a value that is no less than the operating volume lower limit value OL=10% used by the lower limit value selector 9, and outputs, to the control object, the operating volume MV=15% as-is (Step S207 in FIG. 4).

Because the operating volume MV was not subjected to the lower limit limiting procedure (NO in Step S208 in FIG. 4), the alarm outputting unit 11 does not output an alarm signal.

Operation when the Operating Volume Lower Limit Value OL2 is Selected and the Operating Volume MV is Subjected to the Lower Limit Limiting Procedure When in Step S202 in FIG. 4 the device on the higher-level side sets, online, the operating volume lower limit value OL1=5% in the operating volume lower limit value OL1 storage unit 7, the lower limit value selector 9 compares the operating volume lower limit value OL1=5% and the operating volume lower limit value OL2=10% (Step S203 in FIG. 4), and uses OL2=10%, which is the larger, as the operating volume lower limit value OL to be used by the lower limit processor 10 (Step S205 in FIG. 4).

Let us assume that in Step S206 in FIG. 4, the control calculator 4 calculates the operating volume MV=7%.

The lower limit processor 10 limits the operating volume MV=7%, calculated by the control calculator 4, to a value that is no less than the operating volume lower limit value OL=10% used by the lower limit value selector 9, and outputs, to the control object, the operating volume MV=10% that has been subjected to the limiting procedure (Step S207 in FIG. 4).

The operating volume lower limit value OL used by the lower limit value selector 9 is the operating volume lower limit value OL2 and the operating volume MV has been subjected to the lower limit limiting procedure by the lower limit processor 10 (YES in Step S208 in FIG. 4), so the alarm outputting unit 11 outputs an alarm signal (Step S209 in FIG. 4).

In the present example, as described above, an operating volume lower limit value OL1 and an operating volume upper limit value OL2 are compared, and the larger is used as the operating volume lower limit value OL by the lower limit processor 10 procedure, making it possible to prevent invalidation of the lower limit limiting procedure that depends on the circumstances of the controlling device (temperature controller) side through the operating volume lower limit value OL1 being set on the higher-level side. Moreover, in the present example, an alarm signal is outputted when the operating volume lower limit value OL that is used by the lower limit value selector 9 is the operating volume lower limit value OL2 and the operating volume MV is subjected to the lower limit limiting procedure by the lower limit processor 10, making it possible to cause the operator to be aware that a special situation has occurred.

Yet Another Example

Figure 5:
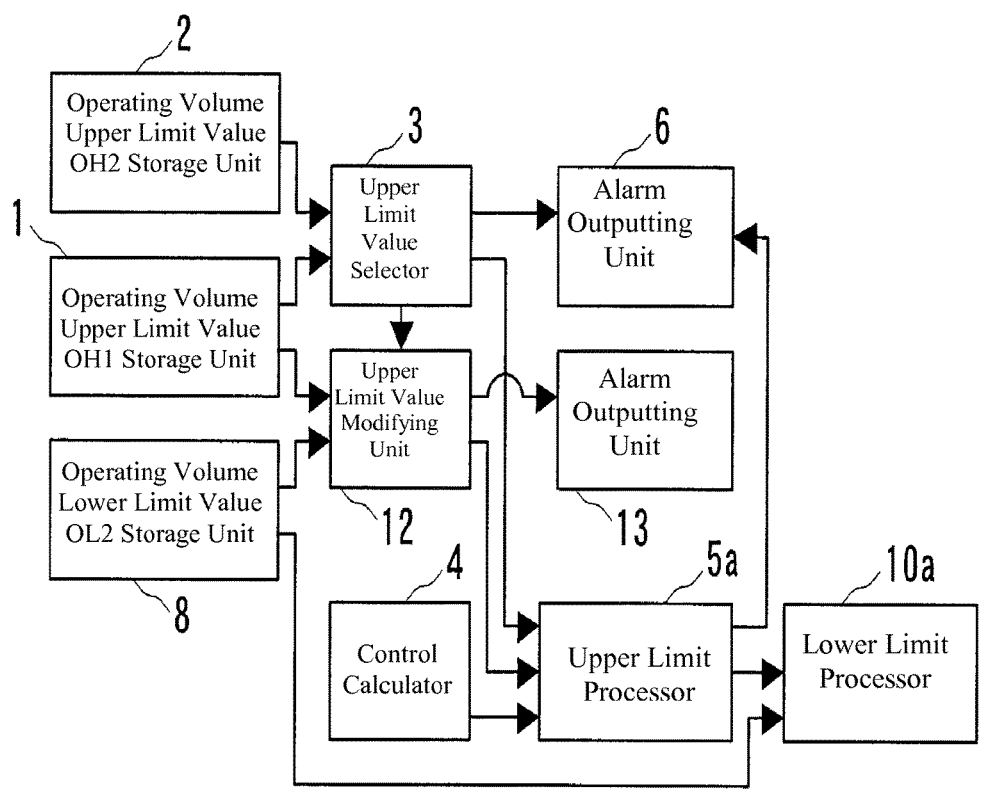
FIG. 5 is a block diagram illustrating a structure of a controlling device according to Yet Another Example of the present invention.

Yet Another Example according to the present invention will be explained next. In the present example, a structure corresponding to the Another Principle and the Further Principle is added to the Example. FIG. 5 is a block diagram illustrating a structure of a controlling device according to the present example. The controlling device of the present example includes an operating volume upper limit value OH1 storage unit 1, an operating volume upper limit value OH2 storage unit 2, an upper limit value selector 3, a control calculator 4, an upper limit processor 5a that performs an upper limit limiting procedure for controlling the value of the operating volume MV, calculated by the control calculator 4, so as to be no more than the operating volume upper limit value OH used by the upper limit value selector 3 or an upper limit value modifying unit, described below, an alarm outputting unit 6, an operating volume lower limit value OL2 storage unit 8, a lower limit processor 10a that performs a lower limit limiting procedure for controlling the value of the operating volume MV, calculated by the control calculator 4, so as to be a value that is no less than the operating volume lower limit value OL2 stored in the operating volume lower limit value OL2 storage unit 8, an upper limit value modifying unit 12 that compares the operating volume upper limit value OH1 and the operating volume lower limit value OL2, when the operating volume upper limit value OH used by the upper limit value selector 3 is the operating volume upper limit value OH1, to use the operating volume lower limit value OL2 as the operating volume upper limit value OH that is to be used by the upper limit processor 5a if OH1<OL2, and an alarm outputting unit 13 that outputs an alarm signal when the operating volume upper limit value OH used by the upper limit value modifying unit 12 is the operating volume lower limit value OL2.

The operation of the controlling device according to the present example will be explained next using FIG. 6. First the operator sets, offline, the operating volume upper limit value OH2 in the operating volume upper limit value OH2 storage unit 2 through an operating panel (not shown) of the controlling device in FIG. 5, prior to the commencement of control (Step S300 in FIG. 6). Here let us assume that the operating volume upper limit value OH2 is set to 80%.

Figure 6:
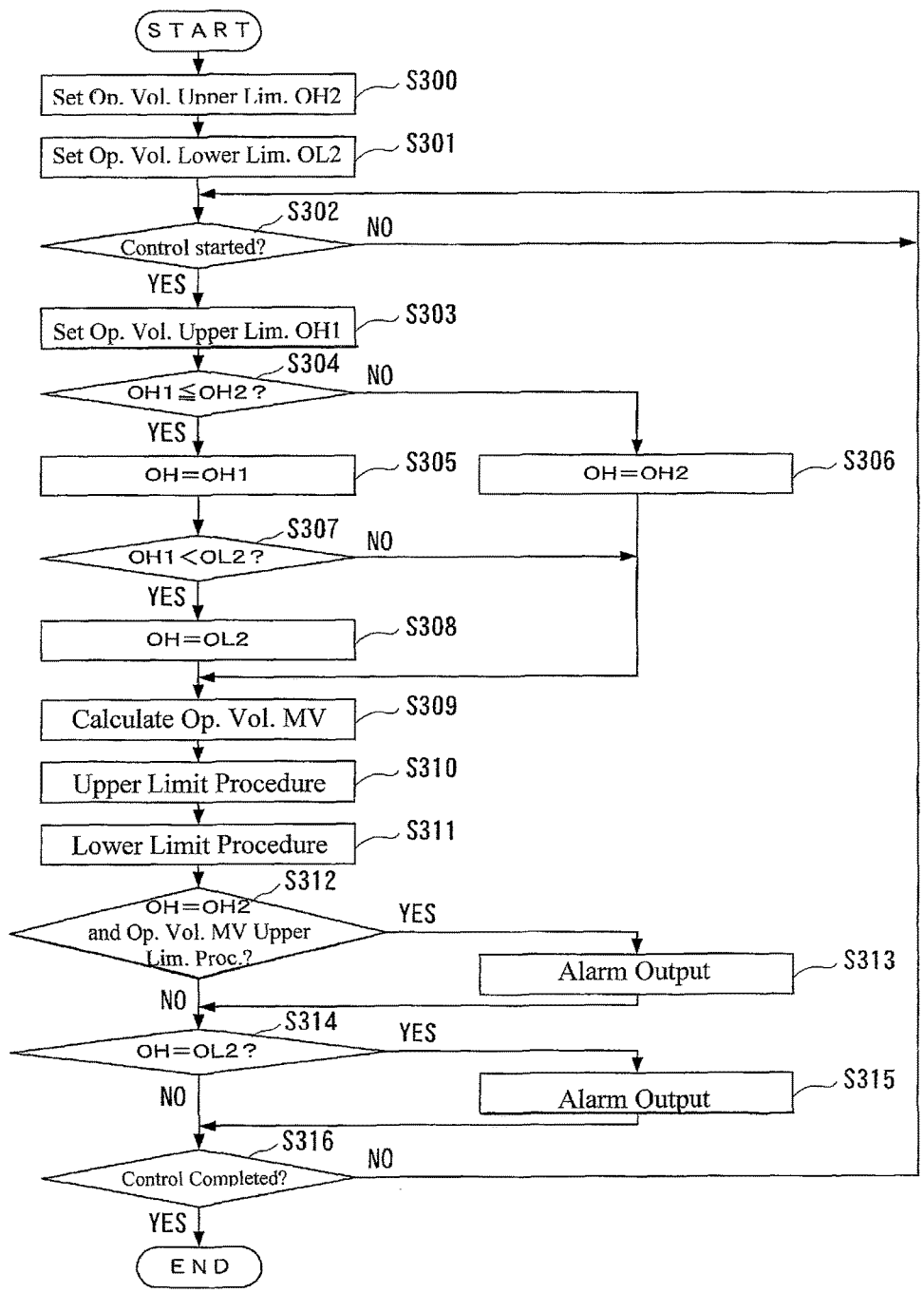
FIG. 6 is a flowchart for explaining the operation of the controlling device according to the Yet Another Example of the present invention.

Moreover the operator sets, offline, the operating volume lower limit value OL2 in the operating volume lower limit value OL2 storage unit 8 through the operating panel of the controlling device in FIG. 5, prior to the commencement of control (Step S301 in FIG. 6). Here let us assume that the operating volume lower limit value OL2 is set to 20%.

Following this, when the control solution using the operating volume upper limit value OH is started by the higher-level side (YES in Step S301 in FIG. 6), a series of procedures is started in the controlling device of FIG. 5 as well.

Operation when the Operating Volume Upper Limit Value OH1 is Selected and the Operating Volume Upper Limit Value OH1 is Used Because OH1>OL2

The device on the higher-level side (for example, the higher-level side controller 101 in FIG. 12) sets, online, the operating volume upper limit value OH1 in the operating volume upper limit value OH1 storage unit 1 (Step S303 in FIG. 6). Here let us assume that the operating volume upper limit value OH1 is set to 30%.

The upper limit value selector 3 compares the operating volume upper limit value OH1 and the operating volume upper limit value OH2 (Step S304 in FIG. 6), and uses the smaller as the operating volume upper limit value OH to be used by the upper limit processor 5a. Because OH1=30% and OH2=80%, the upper limit value selector 3 selects OH1=30%, and sets, for the upper limit processor 5a, the operating volume upper limit value OH=OH1=30% (Step S305 in FIG. 6).

If the operating volume upper limit value OH used by the upper limit value selector 3 is the operating volume upper limit value OH1, the upper limit value modifying unit 12 compares the operating volume upper limit value OH1 and the operating volume lower limit value OL2 (Step S307 in FIG. 6), and if the operating volume upper limit value OH1 is less than the operating volume lower limit value OL2, uses the operating volume lower limit value OL2 as the operating volume upper limit value OH to be used by the upper limit processor 5a (Step S308 in FIG. 6). Because OH1=30% and OL2=20%, the upper limit value modifying unit 12 sets the operating volume upper limit value OH=OH1=30%, without modification, without executing the procedure in Step S308.

Following this, the control calculator 4 calculates an operating volume MV through a PID control calculation (Step S309 in FIG. 6). This procedure is identical to that in Step S106 in FIG. 2. Here let us assume that an operating volume MV=25% is calculated.

The upper limit processor 5a performs an upper limit limiting procedure to limit the operating volume MV, calculated by the control calculator 4, to a value that is no greater than the operating volume upper limit value OH used by the upper limit value selector 3 or the upper limit value modifying unit 12, and outputs, to the lower limit processor 10a, the operating volume MV that has been subjected to the limiting procedure (Step S301 in FIG. 6). Here the operating volume MV=25% and the operating volume upper limit value OH=30%, so the operating volume MV=25% is outputted without change.

The lower limit processor 10a performs a lower limit limiting procedure to control the operating volume MV, outputted from the upper limit processor 5a, to a value that is no less than the operating volume lower limit value OL2 that is stored in the operating volume lower limit value OL2 storage unit 8, and outputs, to the control object, the operating volume MV that has been subjected to the limiting procedure (Step S311 in FIG. 6). Here the operating volume MV=25% and the operating volume lower limit value OL2=20%, so the operating volume MV=25% is outputted without change.

Although in a case wherein the operating volume upper limit value OH used by the upper limit value selector 3 is the operating volume upper limit value OH2 and the operating volume MV has been subjected to the upper limit limiting procedure by the upper limit processor 5a (YES in Step S302 in FIG. 6), the alarm outputting unit 6 would output an alarm signal (Step S313 in FIG. 6), here the operating volume upper limit value OH used by the upper limit value selector 3 is the operating volume upper limit value OH1, so the alarm outputting unit 6 does not output an alarm signal.

Moreover, although in a case wherein the operating volume upper limit value OH used by the upper limit value modifying unit 12 is the operating volume lower limit value OL2 (YES in Step S314 in FIG. 6) the alarm outputting unit 13 would output an alarm signal (Step S315 in FIG. 6), here the operating volume upper limit value OH used by the upper limit value modifying unit 12 is the operating volume upper limit value OH1, so the alarm outputting unit 13 does not output an alarm signal.

The processes in Step S302 through S315 as described above are repeated at each control interval until the control is terminated through, for example, an instruction from an operator (YES in Step S316 in FIG. 6).

Operation when the Operating Volume Upper Limit Value OH1 is Selected and the Operating Volume Upper Limit Value OH1 is not Used Because OH1<OL2

When in Step S303 in FIG. 6 the device on the higher-level side sets, online, the operating volume upper limit value OH1=10% in the operating volume upper limit value OH1 storage unit 1, the upper limit value selector 3 compares the operating volume upper limit value OH1=10% and the operating volume upper limit value OH2=80% (Step S304 in FIG. 6), and uses OH1=10%, which is the smaller, as the operating volume upper limit value OH to be used by the upper limit processor 5a (Step S305 in FIG. 6).

If the operating volume upper limit value OH used by the upper limit value selector 3 is the operating volume upper limit value OH1, the upper limit value modifying unit 12 compares the operating volume upper limit value OH1=10% and the operating volume lower limit value OL2=20% (Step S307 in FIG. 6), and if the operating volume upper limit value OH1=10% is less than the operating volume lower limit value OL2=20%, uses OL2=20% as the operating volume upper limit value OH to be used by the upper limit processor 5a (Step S308 in FIG. 6).

Let us assume that in Step S309 in FIG. 6, the control calculator 4 calculates the operating volume MV=15%.

The upper limit processor 5a performs an upper limit limiting procedure to limit the operating volume MV, calculated by the control calculator 4, to a value that is no greater than the operating volume upper limit value OH used by the upper limit value selector 3 or the upper limit value modifying unit 12 (Step S301 in FIG. 6). Although here the operating volume upper limit value OH=OH1=10% used by the upper limit value selector 3 has further been modified to the operating volume upper limit value OH=OH2=20% by the upper limit value modifying unit 12, the operating volume MV=15%, so the operating volume MV=15% is outputted without change.

The lower limit processor 10a controls the operating volume MV=15%, outputted from the upper limit processor 5a, to a value that is no less than the operating volume lower limit value OL2=20% that is stored in the operating volume lower limit value OL2 storage unit 8, so the operating volume MV=20% that has been subjected to the limiting procedure is outputted to the control object (Step S311 in FIG. 6).

Because the operating volume upper limit value OH used by the upper limit value selector 3 is the operating volume upper limit value OH1 (NO in Step S312 in FIG. 6), the alarm outputting unit 6 does not output an alarm signal.

Because the operating volume upper limit value OH used by the upper limit value modifying unit 12 is the operating volume upper limit value OL2 (YES in Step S314 in FIG. 13), the alarm outputting unit 13 outputs an alarm signal (Step S315 in FIG. 6).

As described above in the present example, if, when the operating volume upper limit value OH used by the upper limit value selector 3 is the operating volume upper limit value OH1 and the operating volume upper limit value OH1 is less than the operating volume lower limit value OL2, then the operating volume lower limit value OL2 is used as the operating volume upper limit value OH that is used by the upper limit processor 5a, thus making it possible to handle the extremely discordant case of the operating volume upper limit value OH1 falling below the user-set operating volume lower limit value OL2. Moreover, in the present example, an alarm signal is outputted when the operating volume upper limit value OH that is used by the upper limit value modifying unit 12 is the operating volume lower limit value OL2, making it possible to cause the operator to be aware that a special situation has occurred.

Further Example

Figure 7:
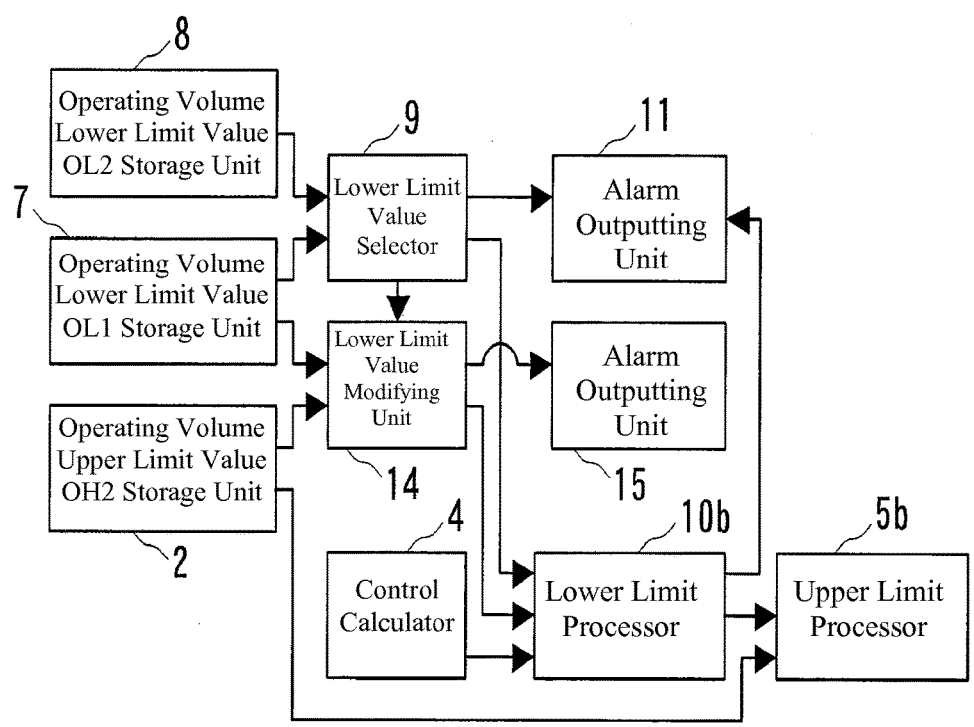
FIG. 7 is a block diagram illustrating a structure of a controlling device according to Further Example of the present invention.

Further Example according to the present invention will be explained next. In the present example, a structure corresponding to the Another Principle and the Further Principle is added to the Another Example. FIG. 7 is a block diagram illustrating a structure of a controlling device according to the present example. The controlling device of the present example includes an operating volume upper limit value OH2 storage unit 2, a control calculator 4, an upper limit processor 5b that performs an upper limit limiting procedure for controlling the value of the operating volume MV, calculated by the control calculator 4, so as to be no more than the operating volume upper limit value OH stored in the operating volume upper limit value OH2 storage unit 2, an operating volume lower limit value OL1 storage unit 7, an operating volume lower limit value OL2 storage unit 8, a lower limit value selector 9, a lower limit processor 10b that performs a lower limit limiting procedure for controlling the value of the operating volume MV, calculated by the control calculator 4, so as to be a value that is no less than the operating volume lower limit value OL used by the lower limit value selector 9 or a lower limit value modifying unit, described below, an alarm outputting unit 11, a lower limit value modifying unit 14 that compares the operating volume lower limit value OL1 and the operating volume upper limit value OH2, when the operating volume lower limit value OL used by the lower limit value selector 9 is the operating volume lower limit value OL1, to use the operating volume upper limit value OH2 as the operating volume lower limit value OL that is to be used by the lower limit processor 10a if OL1>OH2, and an alarm outputting unit 15 that outputs an alarm signal when the operating volume lower limit value OL used by the lower limit value modifying unit 14 is the operating volume upper limit value OH2.

The operation of the controlling device according to the present example will be explained next using FIG. 8. First the operator sets, offline, the operating volume upper limit value OH2 in the operating volume upper limit value OH2 storage unit 2 through an operating panel (not shown) of the controlling device in FIG. 7, prior to the commencement of control (Step S400 in FIG. 8). Here let us assume that the operating volume upper limit value OH2 is set to 80%.

Figure 8:
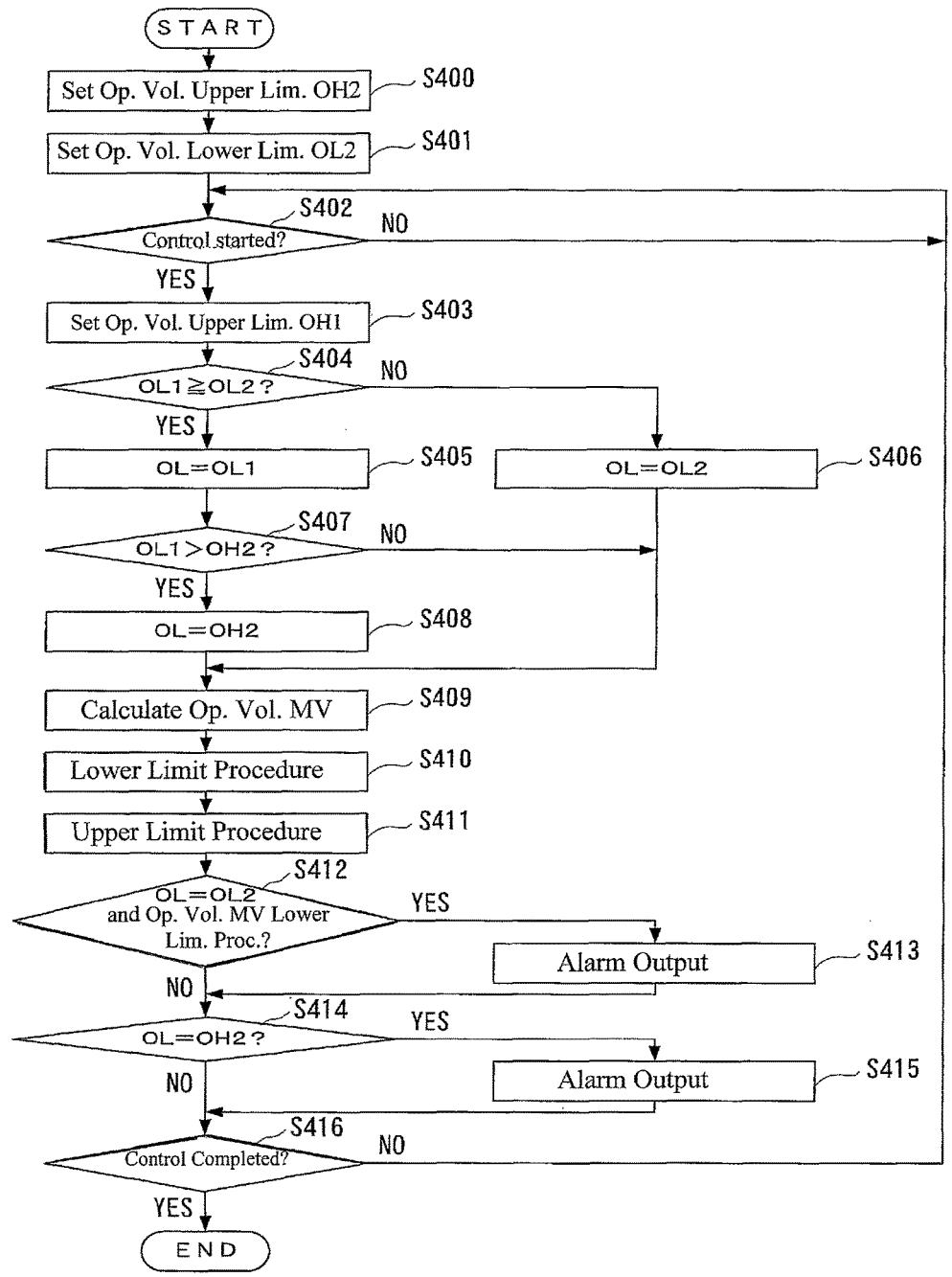
FIG. 8 is a flowchart for explaining the operation of the controlling device according to the Further Example of the present invention.

Moreover the operator sets, offline, the operating volume lower limit value OL2 in the operating volume lower limit value OL2 storage unit 8 through the operating panel of the controlling device in FIG. 7, prior to the commencement of control (Step S401 in FIG. 8). Here let us assume that the operating volume lower limit value OL2 is set to 20%.

Following this, when the control solution using the operating volume lower limit value OL is started by the higher-level side device (such as a PC) (YES in Step S401 in FIG. 8), a series of procedures is started in the controlling device of FIG. 7 as well.

Operation when the Operating Volume Lower Limit Value OL1 is Selected and the Operating Volume Upper Lower Value OL1 is Used Because OL1<OH2

The device on the higher-level side sets, online, the operating volume lower limit value OL1 in the operating volume lower limit value OL1 storage unit 7 (Step S402 in FIG. 8). Here let us assume that the operating volume lower limit value OL1 is set to 70%.

The lower limit value selector 9 compares the operating volume lower limit value OL1 and the operating volume lower limit value OL2 (Step S404 in FIG. 8), and uses the larger as the operating volume lower limit value OL to be used by the lower limit processor 10*b*. Because OL1=70% and OL2=20%, the lower limit value selector 9 selects OL1=70%, and sets, for the lower limit processor 10*b*, the operating volume lower limit value OL=OL1=70% (Step S405 in FIG. 8).

If the operating volume lower limit value OL used by the lower limit value selector 9 is the operating volume lower limit value OL1, the lower limit value modifying unit 14 compares the operating volume lower limit value OL1 and the operating volume upper limit value OH2 (Step S07 in FIG. 8), and if the operating volume lower limit value OL1 is greater than the operating volume upper limit value OH2, uses the operating volume upper limit value OH2 as the operating volume lower limit value OL to be used by the lower limit processor 10*b* (Step S408 in FIG. 8). Because OL1=70% and OH2=80%, the lower limit value modifying unit 14 sets the operating volume lower limit value OL=OL1=70%, without modification, without executing the procedure in Step S408.

Following this, the control calculator 4 calculates an operating volume MV through a PID control calculation (Step S409 in FIG. 8). This procedure is identical to that in Step S106 in FIG. 2. Here let us assume that an operating volume MV=75% is calculated.

The lower limit processor 10*b* performs a lower limit limiting procedure to limit the operating volume MV, calculated by the control calculator 4, to a value that is no less than the operating volume lower limit value OL used by the lower limit value selector 9 or the lower limit value modifying unit 14, and outputs, to the upper limit processor 5*b*, the operating volume MV that has been subjected to the limiting procedure (Step S410 in FIG. 8). Here the operating volume MV=75% and the operating volume lower limit value OL=70%, so the operating volume MV=75% is outputted without change.

The upper limit processor 5*b* performs an upper limit limiting procedure to control the operating volume MV, outputted from the lower limit processor 10*b*, to a value that is no more than the operating volume upper limit value OH2 that is stored in the operating volume upper limit value OH2 storage unit 2, and outputs, to the control object, the operating volume MV that has been subjected to the limiting procedure (Step S411 in FIG. 8). Here the operating volume MV=75% and the operating volume upper limit value OH2=80%, so the operating volume MV=75% is outputted without change.

Although in a case wherein the operating volume lower limit value OL used by the lower limit value selector 9 is the operating volume lower limit value OL2 and the operating volume MV has been subjected to the lower limit limiting procedure by the lower limit processor 10*b* (YES in Step S412 in FIG. 8), the alarm outputting unit 11 would output an alarm signal (Step S413 in FIG. 8), here the operating volume lower limit value OL used by the lower limit value selector 9 is the operating volume lower limit value OL1, so the alarm outputting unit 11 does not output an alarm signal.

Moreover, although in a case wherein the operating volume lower limit value OL used by the lower limit value modifying unit 14 is the operating volume lower limit value OL2 (YES in Step S414 in FIG. 8) the alarm outputting unit 15 would output an alarm signal (Step S415 in FIG. 8), here the operating volume lower limit value OL used by the lower limit value modifying unit 14 is the operating volume lower limit value OL1, so the alarm outputting unit 15 does not output an alarm signal.

The processes in Step S402 through S415 as described above are repeated at each control interval until the control is terminated through, for example, an instruction from an operator (YES in Step S416 in FIG. 8).

Operation when the Operating Volume Lower Limit Value OL1 is Selected and the Operating Volume Upper Lower Value OL1 is not Used Because OL1>OH2

When in Step S403 in FIG. 8 the device on the higher-level side sets, online, the operating volume lower limit value OL1=90% in the operating volume lower limit value OL1 storage unit 7, the lower limit value selector 9 compares the operating volume lower limit value OL1=90% and the operating volume lower limit value OL2=20% (Step S404 in FIG. 8), and uses OL1=90%, which is the larger, as the operating volume lower limit value OL to be used by the lower limit processor 10*b* (Step S405 in FIG. 8).

If the operating volume lower limit value OL used by the lower limit value selector 9 is the operating volume lower limit value OL1, the lower limit value modifying unit 14 compares the operating volume lower limit value OL1=90% and the operating volume upper limit value OH2 (Step S407 in FIG. 8), and if the operating volume lower limit value OL1=90% is greater than the operating volume upper limit value OH2=80%, uses the operating volume upper limit value OH2=80% as the operating volume lower limit value OL to be used by the lower limit processor 10*b* (Step S408 in FIG. 8).

Let us assume that in Step S409 in FIG. 8, the control calculator 4 calculates the operating volume MV=85%.

The lower limit processor 10*b* performs a lower limit limiting procedure to limit the operating volume MV, calculated by the control calculator 4, to a value that is no less than the operating volume lower limit value OL used by the lower limit value selector 9 or the lower limit value modifying unit 14 (Step S401 in FIG. 8). Although here the operating volume lower limit value OL=OL1=90% used by the lower limit value selector 9 has further been modified to the operating volume lower limit value OL=OH2=80% by the lower limit value modifying unit 14, the operating volume MV=85%, so the operating volume MV=85% is outputted without change.

The upper limit processor 5*b* controls the operating volume MV=85%, outputted from the lower limit processor 10*b*, to a value that is no more than the operating volume upper limit value OH2=80% that is stored in the operating volume upper limit value OH2 storage unit 2, so outputs, to the control object, the operating volume MV=80% that has been subjected to the limiting procedure (Step S411 in FIG. 8).

Because the operating volume lower limit value OL used by the lower limit value selector 9 is the operating volume lower limit value OL1 (NO in Step S412 in FIG. 8), the alarm outputting unit 11 does not output an alarm signal.

Because the operating volume lower limit value OL used by the lower limit value modifying unit 14 is the operating volume upper limit value OH2 (YES in Step S412 in FIG. 8), the alarm outputting unit 15 outputs an alarm signal (Step S415 in FIG. 8).

As set forth above, in the present example, if, when the operating volume lower limit value OL used by the lower limit value selector 9 is the operating volume lower limit value OL1 and the operating volume lower limit value OL1 is greater than the operating volume upper limit value OH2, then the operating volume upper limit value OH2 is used as the operating volume lower limit value OL that is used by the lower limit processor 10b, thus making it possible to handle the extremely discordant case of the operating volume lower limit value OL1 being above the user-set operating volume upper limit value OH2. Moreover, in the present example, an alarm signal is outputted when the operating volume lower limit value OL that is used by the lower limit value modifying unit 14 is the operating volume upper limit value OH2, making it possible to cause the operator to be aware that a special situation has occurred.

Typically, in a PID calculation, often the operating volume upper limit value OH and the operating volume lower limit value OL are used as indicators of the integration limits. Consequently, in the Example, the Another Example, the Yet Another Example and the Further Example, preferably the operating volume upper limit value OH and the operating volume lower limit value OL that are applied to the operating volume MV that is calculated by the control calculator 4 are established prior to the calculation of the operating volume MV by the control calculator 4. In the individual examples, either the upper limit limiting procedure or the lower limit limiting procedure may be executed first, through the operating volume upper limit value OH and the operating volume lower limit value OL being established appropriately prior to executing the limiting procedure.

In the Example and the Yet Another Example, the structure is one wherein a control solution using a operating volume upper limit value OH is performed by a device on the higher-level side (such as a PC), and in the Another Example and the Further Example, the structure is one wherein a control solution using an operating volume lower limit value OL is performed by a device on the higher-level side; however, if a control solution using both the operating volume upper limit value OH and the operating volume lower limit value OL is performed by a device on the higher-level side, this may be embodied through an appropriate combination of the structures of the Example, the Another Example, the Yet Another Example and the Further Example.

Figure 9:
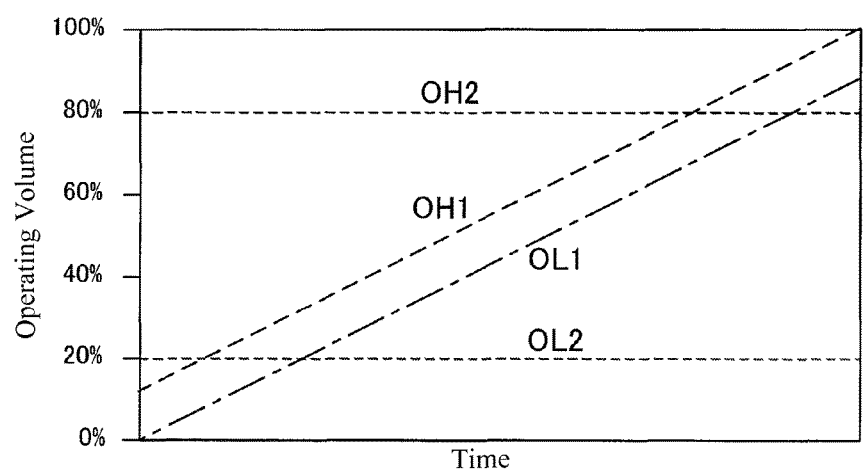
FIG. 9 is a diagram illustrating modifications to the operating volume upper limit value OH1 and operating volume lower limit value OL1 when the Example, the Another Example, the Yet Another Example and the Further Example of the present invention are combined.
Figure 10:
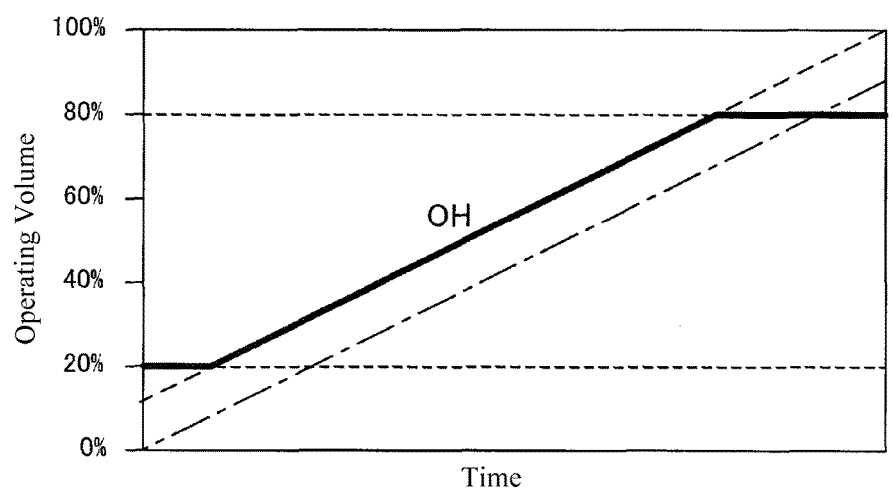
FIG. 10 is a diagram illustrating modifications to the operating volume upper limit value OH when the Example, the Another Example, the Yet Another Example and the Further Example of the present invention are combined.
Figure 11:
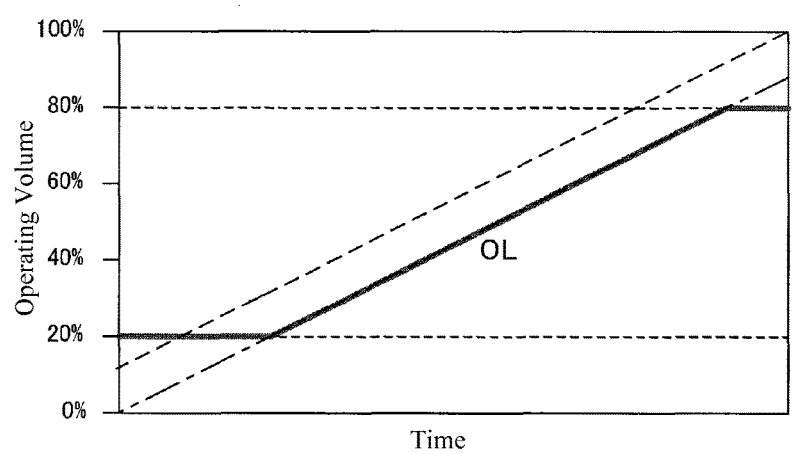
FIG. 11 is a diagram illustrating modifications to the operating volume lower limit value OL when the Example, the Another Example, the Yet Another Example and the Further Example of the present invention are combined.

When embodying through combining the structures of the Example, the Another Example, the Yet Another Example and the Further Example, FIG. 9, FIG. 10, and FIG. 11 show how to determine the operating volume upper limit value OH and the operating volume lower limit value OL when the operating volume upper limit value OH1 and the operating volume lower limit value OL1 that are set online from the higher-level side are changed dynamically as time elapses. In these figures, the operating volume upper limit value OH2 is held constant at 80% and the operating volume lower limit value OL2 is held constant at 20%. FIG. 9 is a diagram illustrating modifications to the operating volume upper limit value OH1 and operating volume lower limit value OL1, FIG. 10 shows the modifications to the operating volume upper limit value OH, and FIG. 11 shows the modifications to the operating volume lower limit value OL.

The controlling device, which is explained in the Example, the Another Example, the Yet Another Example and the Further Example, may be embodied through a computer that is equipped with a CPU, a storage device, and an interface, combined with a program for controlling these hardware resources. The CPU executes the processes explained in the Example, the Another Example, the Yet Another Example and the Further Example, in accordance with a program that is stored in the memory device.

The present invention can be applied to a control system wherein a control solution that uses an operating volume upper limit value and/or an operating volume lower-limit value is executed by the higher-level device.

The invention claimed is:

1. A controlling device comprising:
an operating volume upper limit value (OH1) storage unit that stores an operating volume upper limit value (OH1) set from a device on a higher-level side;
an operating volume upper limit value (OH2) storage unit that stores an operating volume upper limit value (OH2) set by an operator;
an operating volume lower limit value (OL2) storage unit that stores an operating volume lower limit value (OL2) set by an operator;
an upper limit value selector that compares the operating volume upper limit value (OH1) and the operating volume upper limit value (OH2) and using the smaller as an operating volume upper limit value (OH) to be used in an upper limit limiting procedure;
an upper limit value modifying unit that compares the operating volume upper limit value (OH1) and the operating volume lower limit value (OL2) when the operating volume upper limit value (OH) used by the upper limit value selector is the operating volume upper limit value (OH1), and if the operating volume upper limit value (OH1) is less than the operating volume lower limit value (OL2), uses the operating volume lower limit value (OL2) as the operating volume upper limit value (OH) to be used by the upper limit limiting procedure;
a control calculator that calculates an operating volume (MV);
an upper limit processor that performs the upper limit limiting procedure to control the operating volume (MV), calculated by the control calculator, to a value that is no greater than the operating volume upper limit value (OH) used by the upper limit value selector for the upper limit processor; and
a lower limit processor that performs a lower limit limiting procedure to control the operating volume (MV), outputted from the upper limit processor, to a value that is no less than the operating volume lower limit value (OL2) stored in the operating volume lower limit value (OL2) storage unit.

2. The controlling device as set forth in claim 1, further comprising:
a first alarm outputting unit that outputs an alarm signal when the operating volume upper limit value (OH) that is used by the upper limit value selector is the operating volume upper limit value (OH2) and the operating volume (MV) calculated by the control calculator is greater than the operating volume upper limit value (OH); and
a second alarm outputting unit that outputs an alarm signal when the operating volume upper limit value (OH) that is used by the upper limit value modifying unit is the operating volume lower limit value (OL2).

* * * * *